(12) United States Patent
Denis et al.

(10) Patent No.: US 10,266,298 B2
(45) Date of Patent: Apr. 23, 2019

(54) CONTAINER FOR PRODUCT WITH THIN WALL

(71) Applicant: Nestle Waters Management & Technology, Issy-les-Moulineaux (FR)

(72) Inventors: Gerard Denis, Reims (FR); Alain Contal, Epinal (FR); Cyrille Durand, Vittel (FR)

(73) Assignee: Nestle Waters Management & Technology, Issy-les-Moulineaux (FR)

( * ) Notice: Subject to any disclaimer, the term of this patent is extended or adjusted under 35 U.S.C. 154(b) by 628 days.

(21) Appl. No.: 13/849,217

(22) Filed: Mar. 22, 2013

(65) Prior Publication Data

US 2013/0213922 A1    Aug. 22, 2013

Related U.S. Application Data

(63) Continuation of application No. 10/553,329, filed as application No. PCT/EP2004/003194 on Mar. 26, 2004, now abandoned.

(30) Foreign Application Priority Data

Apr. 15, 2003    (EP) .................................... 03008634

(51) Int. Cl.
    *B65D 1/02*     (2006.01)
    *B29C 49/00*    (2006.01)
    *B29C 49/10*    (2006.01)
    *B65D 23/10*    (2006.01)
    *B29D 22/00*    (2006.01)
    *B29C 49/06*    (2006.01)

(52) U.S. Cl.
    CPC ............ *B65D 1/02* (2013.01); *B29C 49/0042* (2013.01); *B29C 49/10* (2013.01); *B29D 22/003* (2013.01); *B65D 23/102* (2013.01); *B29C 49/06* (2013.01); *B29K 2995/0041* (2013.01)

(58) Field of Classification Search
    CPC ..... B29C 49/06; B29C 49/16; B29C 49/0042; B29C 49/10; B29D 22/003; B29K 2995/0041; B65D 1/02; B65D 23/102; Y10T 428/1352
    USPC ........ 428/34.1, 141, 36.92, 542.8, 327, 335, 428/336, 349, 35.7, 35.8, 36
    See application file for complete search history.

(56) References Cited

U.S. PATENT DOCUMENTS

| | | | |
|---|---|---|---|
| 5,556,675 A * | 9/1996 | Yamamoto | B29C 49/0005 264/512 |
| 2002/0076462 A1* | 6/2002 | Boyd | B29C 49/46 425/143 |

(Continued)

FOREIGN PATENT DOCUMENTS

| | | | | |
|---|---|---|---|---|
| DE | 19500006 | | 7/1996 | |
| EP | 1022223 A1 * | | 7/2000 | ........... B65D 1/0223 |

(Continued)

*Primary Examiner* — Gerard Higgins
*Assistant Examiner* — Kevin C Ortman, Jr.
(74) *Attorney, Agent, or Firm* — K&L Gates LLP

(57) ABSTRACT

The present invention concerns a container having a body formed by wall or walls with a greater diameter S1 and at least a neck with a diameter S2, container made from a semi-crystalline PET, having a wall thickness of less than 100 μm, substantially in the middle of its body and having a complex, three dimensional shape convenient for gripping, this part having a diameter S3.

8 Claims, 3 Drawing Sheets

(56) References Cited

U.S. PATENT DOCUMENTS

| | | | |
|---|---|---|---|
| 2002/0100378 A1 | 8/2002 | Dupuis | |
| 2002/0150703 A1* | 10/2002 | Collette | B29C 49/12 |
| | | | 428/34.1 |
| 2003/0006210 A1* | 1/2003 | Iizuka | B65D 23/106 |
| | | | 215/398 |
| 2006/0255049 A1* | 11/2006 | McCarthy | A47G 19/2205 |
| | | | 220/703 |

FOREIGN PATENT DOCUMENTS

| | | | |
|---|---|---|---|
| JP | 02305620 | 5/1989 | |
| JP | 10007121 | 1/1998 | |
| JP | 10095903 | 4/1998 | |
| JP | 201122237 | 10/1999 | |
| JP | 2001-122237 * | 5/2001 | ............... B65D 1/02 |
| WO | 0042878 | 7/2000 | |
| WO | 0156896 | 8/2001 | |

* cited by examiner

CONTAINER FOR PRODUCT WITH THIN WALL

PRIORITY CLAIM

This application is a continuation of U.S. application Ser. No. 10/553,329, filed Dec. 6, 2005, which is National Stage of International Application No. PCT/EP2004/003194, filed on Mar. 26, 2004, which claims priority to European Patent Application No. 03008634.2, filed on Apr. 15, 2003, the entire contents of which are incorporated herein by reference.

BACKGROUND

The present invention relates to the field of the packaging of flowable products such as liquids or pasty products, particularly that of containers intended to contain beverages and more especially mineral water.

In the field of the packaging of potable water, it is commonplace to use semirigid packaging made of synthetic substances, commonly known as plastics, such as PET (poly-ethylene-terephthalate), PP (polypropylene), HDPE (high density polyethylene), etc. These packagings are generally made in the form of bottles the capacities of which are, at least in France, in most cases, between 25 cl and 1.5 liters or even 2 liters. Larger volumes are relatively infrequent, particularly on account of their weight.

Admittedly, bi-oriented PET containers of cylindrical shape or of rectangular cross diameter, the standard volume of which may be as much as 5 liters or more, are known. However, the mechanical strength of such containers is customarily low for weights of synthetic material which are proportionately higher and therefore not very economical. By way of indication, for modest mechanical properties, a 5-liter bottle requires at least 75 g of PET for the cylindrical version or at least 100 g for a standard bottle of rectangular cross diameter.

To improve the overall mechanical properties of such containers, particularly as far as their mechanical resistance to vertical crushing is concerned, the containers currently marketed have wall thicknesses which are significantly greater and reinforcing structures (bulges, stiffening ridges, etc.) which further increase the total weight of the said containers, their complexity and therefore their cost of manufacture.

There are already some solutions to provide to the consumer containers with less thick walls and therefore containing less material. The patents DE 19500006 and JP 10007121 concerns packagings allowing for the first to guarantee a complete emptying and to decrease the volume of waste and for the other to guarantee a standing position and a good compactness. In this case, it is polyethylene, which is worked by extrusion and blow-molding. In this case, the parison of the container does not allow to reach a big volume of the final container.

SUMMARY

The present invention is aimed at alleviating the disadvantages of the known containers and its purpose is to supply a container for a flowable product which, for the same volume, requires less plastic than a standard container while at the same time having comparable or higher mechanical properties.

Additional features and advantages are described herein, and will be apparent from, the following Detailed Description and the figures.

DETAILED DESCRIPTION

Figure 1:
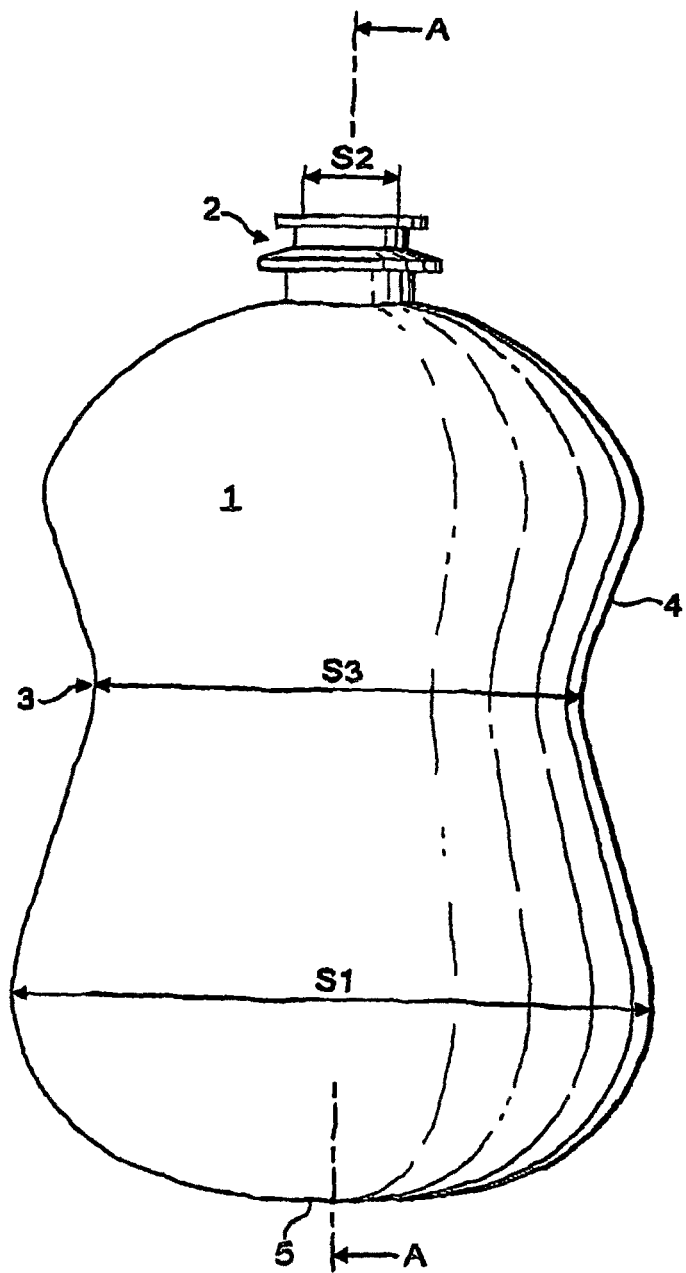
FIG. 1 is a schematic view in side elevation and in diameter of one embodiment of the container according to the invention.

The subject of the present invention is a container having a body formed by wall or walls with a greater diameter S1 and at least a neck with a diameter S2 made from a semi-crystalline PET, having a wall thickness of less than 100 μm, substantially in the middle of its body and having a complex, three dimensional shape convenient for gripping, this part having a diameter S3.

Semi-crystalline PET means in the present specification a PET having a crystallinity comprised between 10 and 60%. More preferably, the crystallinity is comprised between 20 and 40%.

According to a feature of the invention, the ratio S2 on S1 is comprised between 1:2 and 1:15. There is no product on the market, and also in the cited documents, mentioning the above mentioned ratio with a low wall thickness. By working with a plastic material, for example with PET, by blow-molding, it is not evident to reach the above mentioned ratio, while keeping a good integrity of the container. Furthermore, when the container according to the invention is full, it is practically undistortable, contrary to a conventional bottle manufactured with the same material.

The container of the invention has the part convenient for gripping substantially in the middle of its body and has a diameter S3 smaller than S1. According to a preferred embodiment of the invention, the ratio of diameter of the greater diameter S1 to the smaller diameter S3 is comprised between 1.2:1 to 2:1.

The present invention concerns further a packaging assembly made up of
- a container having a body formed by wall or walls with a greater diameter S1 and at least a neck with a diameter S2, container made from a semi-crystalline PET and having a wall thickness of less than 100 μm, substantially in the middle of its body and
- a product in the container and
- closing means for closing off or distributing the product from the neck,
- the container being substantially incompressible by hand when filled with the product.

This incompressibility applies for all types of products, even for a still product. In the present specification, incompressible means that when squeezed the container only deforms very slightly and then will recover its original shape. In contrast, a standard bottle will buckle and deform.

According to a feature of the invention, the container comprises on its outside a printing made by pad printing. The advantage of this solution, is that it suppresses the need of having a paper stuck around the container.

The volume of the container used according to the invention can have all type of capacity, comprised between 20 cl and 20 l capacity. The container is intended to contain all type of product, like pasty, liquid, semi-liquid, granular or powdered product. Under liquid product, we understand water or a still liquid beverage, particularly still mineral waters, carbonated water or a carbonated liquid beverage, particularly sparkling mineral water. Other types of liquid products are also possible, like chemical products, oil, essence, perfumes, pharmaceutical products. Under pasty products, we understand food and non food products, like mayonnaise, cosmetic compounds and others.

The means of closing are either a cap, or sealed membrane. The caps can be used for any diameter of opening of the neck. On the contrary, the sealed membranes are preferred with smaller diameter of the neck, for example in the area of 10 mm. In this case, the container can support high compressions, for example by the storage and by the transportation. For diameters of around 10 mm, the container can support an internal pressure of the order of 5 bar. It is also possible to close the container by sealing or welding the neck, wherein a cutting object or similar is provided for the opening.

The container according to the invention, empty or full, can thus be stored in a stable way, that is to say maintaining its original shape of manufacture, in a vertical position (neck uppermost) by making it, for example, rest on a predefined (container empty) flat bottom or on the convex bottom originally given at the time of manufacture, which deforms locally at constant surface area under the weight of the contents into a non-planar (concave) portion so as to form a base which is stable enough for the said full container.

In an alternative, the bottom may therefore be provided, at the time of its manufacture, with a flat region (planar or roughly planar part) that is preshaped.

In a particularly advantageous manner, the container according to the invention has a circular or substantially circular cross diameter.

This is because this geometry with symmetry of revolution is particularly easy and therefore economical to manufacture and has the advantage of allowing the container to be filled with products which can emit gaseous sub-stances, such as carbonated beverages (sparkling waters, sodas, etc.) in particular, which are widely consumed worldwide these days. Such a shape is therefore particularly well suited to these liquids in that the release of carbon dioxide or other gas has a tendency to deform the bodies of bottles which do not have symmetry of revolution, having a negative impact on their stability, grasp and ease of handling, appearance, etc.

As a preference, the container has an ovoid or substantially ovoid overall shape. This natural shape derived from an egg represents a structure whose resistance to vertical and/or transversal loads is optimized, thus making it possible, for a given volume and a given amount of material, to achieve mechanical properties which are equivalent to or even better than the cylindrical or roughly cylindrical shapes customarily encountered in this domain.

In another embodiment, the container according to the invention has a three dimensional shape convenient for gripping, a spherical, substantially spherical or cylindrical overall shape.

According to another feature, the plastic used to form the wall or walls is a semicrystalline plastic with a slow rate of crystallization, the glass transition temperature ($T_g$) of which is 70° C. or higher and the crystallization temperature Tc is around 140° C.

A slow rate of crystallization is to be understood as meaning a rate which makes it possible to have an amorphous state by quick cooling.

Advantageously, the plastic used to form the wall or walls is chosen from the group formed by PET (polyethylene terephthalate) and PEN (polyethylene naphtalate). It has been noted that the drawing of the PET has no negative influence on the water barrier properties of the obtained container and that also a thickness of around 50 μm and less guarantees a good safety of the container itself and of the storage.

In order to guarantee both the flexibility needed for the aforementioned deformation and sufficient mechanical strength, the container according to the invention is further characterized in that the thickness of the wall or walls forming the body of the container is between 30 μm and 100 μm, preferably between 50 μm and 70 μm.

As already mentioned, small thicker areas or portions of walls may also be provided on the body of the said container, particularly in close proximity to the neck and/or the bottom, so as to reinforce these parts locally. Such reinforcements may in particular be useful to facilitate the filling of the said containers or to increase their stability during storage.

As a preference, the container is further characterized in that the body and the neck of the container are made as a single piece. This makes it possible to avoid any join or weld which may constitute a region of greater weakness.

Indeed, according to another feature, the container according to the invention is characterized in that, it has a high resistance to vertical and/or transverse loads allowing good resistance to transportation. For example, for a working volume of 5 liters, the amount of PET used to produce the said container is about 30 g. for resistance to a vertical load of about 65 kg. This represents a significant saving in plastic, the few 5-liter containers that are currently on the market requiring an amount of polymer which, for comparable mechanical strength, is over two times greater than the amount needed to manufacture a container according to the present invention. When containers of lower volumes are used, for example of the order of 33 cl, the quantity of plastic material is of the order of 3-4 g, in comparison with a bottle of the same volume, wherein the amount of plastic is of the order of at least 12 g. This type of container supports a vertical loading of more than about 100 kg. That the container supports a vertical or transverse loading means that the weight given does not deteriorate the package integrity, that is does not lead to a risk of breaking said container.

According to another embodiment, the container according to the invention is characterized in that the body has a bottom exhibiting a planar or roughly planar part. This part may be produced using all the methods habitually encountered in the field of the manufacture of synthetic containers (flat bottom with or without reinforcing ribs, petaloid bottom, etc.).

However, provision may be made for the bottom of the container according to the invention to consist only of the wall in its original shape as directly obtained after the stretch-blow moulding of the corresponding preform, that is to say without additional special structure, shape or overmoulding. In the case of an ovoid shape, for example, the bottom will be that of this concave shape.

These simple shapes also allow the container according to the invention to be used as a refill or recharge for water coolers, for which a flat bottom is not necessary, these refills generally being used by inserting the container, head (neck) downmost, into the accommodation device of the said water cooler. In addition, this type of surface geometry also makes it possible to increase the area of heat exchange between the said container and the chilling device usually present in the said water coolers.

The curvature of the bottom may possibly be slightly flattened in this region so that the container can be stored vertically more easily without falling sideways.

For greater stability, the wall thickness may be increased slightly at the said bottom (thickness of the order of 100 to 150 μm).

In another alternative form, the containers according to the invention may also be equipped with rigid bases (known per se) intended to accommodate a non-planar bottom.

According to another alternative form, the container according to the invention is characterized in that the neck is fitted with a closure and/or distribution means produced in the form of a distribution tap which can be operated with one hand.

Such distribution taps, which are known per se, advantageously allow the distribution of the flowable product contained in the container to be regulated in a particularly convenient way, for example when this container is stored horizontally on the shelves of a refrigerator, the other hand holding the container into which the said flowable product is to be transferred, for example with a view to consuming it.

Because of its flexible nature, the geometry of the container can also adapt more readily to that of the storage place, as opposed to the rigid cans currently available which need to observe very specified dimensions in order to be able to be stored in restricted spaces such as the internal compartments of refrigerators. In addition, the space freed as a container according to the invention is emptied can also be put to use for storing objects the size or shape of which can vary, which is not the case with rigid containers in which the volume of liquid removed is systematically replaced with air. In this type of container, the volume initially occupied remains so until the empty container is removed from the refrigerator.

Another subject of the present invention is the use of the container by way of large-capacity, at least 5-liter capacity, container intended to contain water or a still liquid beverage, particularly still mineral water.

Another subject of the present invention is the use of the container according to the invention by way of large-capacity, at least 5-liter capacity, container intended to contain carbonated water or a carbonated liquid beverage, particularly sparkling mineral water.

Of course, the containers of the present invention are not in any way limited to flat or sparkling mineral waters but can be intended to contain all sorts of flowable products, edible or inedible liquids of greater or lesser fluidity such as, for example, fruit juices, milk-based beverages, etc., and also sauces or condiments (ketchup, mustard, dressing, etc.) or non-food liquids (deionized water, cleaning products, detergents, etc.).

The present invention concerns further a packaging assembly made up of
- a container having a body formed by wall or walls with a greater diameter S1 and at least one neck with a diameter S2, container made from a semi-crystalline PET and having a wall thickness of less than 100 μm, substantially in the middle of its body,
- a product which contains a functional component and closing means for closing off or distributing the product from the neck.

This assembly is pasteurisable.

The functional component is taken from the group consisting of a fibre, plant extract, fruit extracts, vitamins and flavors. The assembly is pasteurised or sterilised at a temperature in excess of 60° C.

The way of producing the container according to the invention is not critical and can be stretch blow molding or any other way known by the man skilled in the art, like free blowing. In these cases, the parameters of the process have to be adapted.

One possible example is the stretch blow molding. In this case, the subject of the present invention is a method for manufacturing a body of a container according to the invention, characterized in that the said body is obtained by blow moulding of a PET preform with high stretch index in comparison with the classical stretching of a preform. Compared with the blowing of plastic bottles, wherein the blowing pressure is comprised between 30 and 40 bar, according to the process of the invention, it is sufficient to blow at a pressure of around 3 or 4 times less. This reduces the cost of the process and also of the machine which is used. Concerning the stretch index, it is depending of the volume of the final container. For example, in the case of a container having a volume of less than 100 cl, the stretch index is between 100 and 300 cm. In the case of a container having a volume of 500 to 1000 cl, the stretch index is comprised between 500 and 700 cm. In the case of container having volume of 2000 cl or more, the stretch index is around and more than 1000 cm.

The stretch index is defined as follows:

$$\text{Stretch index} = \frac{\text{internal volume of the stretched container*}}{\text{internal volume of the preform before stretching*}} \times \frac{1}{f}$$

$$f = \frac{\text{internal surface of the container*}}{\text{internal volume of the stretched container*}} \ (\text{cm}^{-1})$$

*with the exclusion of the neck

In the embodiments of the containers according to the invention, for volumes of 33 cl, 1 liter, 5 l, 10 l and 20 l, the different ratios S2 on S1 are comprised between 1:4.5 and 1:15.

Because of the incompressibility of the container of the invention, there is no need to have reinforcing structures. The consequence is that it is possible to have simple shapes, which have the advantage of providing transparency and purity. This is particularly important for the consumer in the case of a container for drinking water. Another advantage of this container is that it can be emptied without air coming in and this reduces the risk of contamination or odours entering the product that may cause taste changes or degradation.

Figure 2:
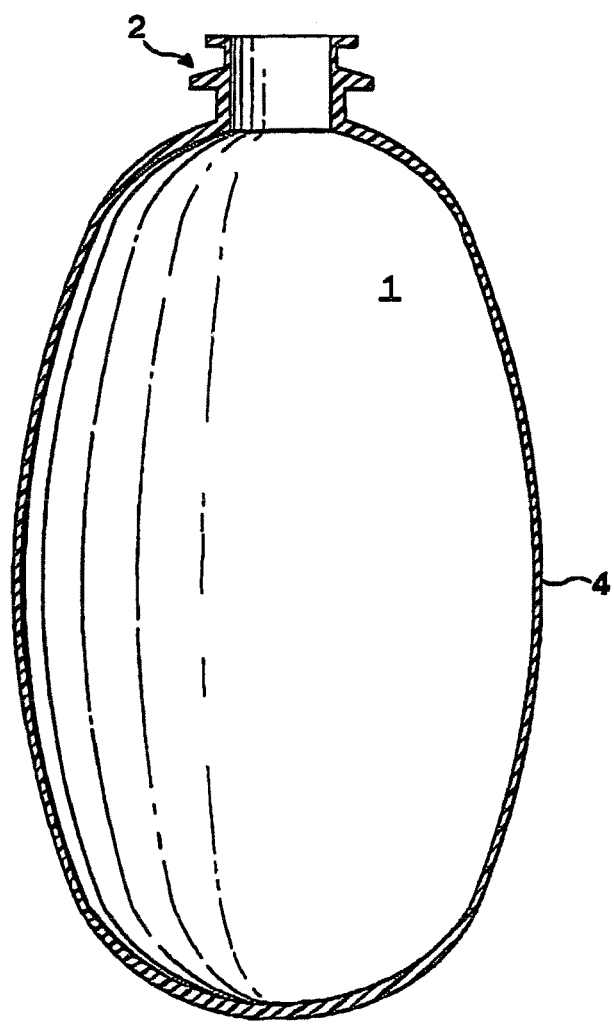
FIG. 2 is a cross section along line A-A of FIG. 1

Reference is made first of all to FIGS. 1 and 2 which show a schematic view in side elevation and in diameter of one embodiment of the container according to the invention.

In the embodiment described and depicted, the container for a flowable product, particularly for a beverage and, in particular, for mineral water, essentially consists of a body 1 and of at least one neck 2, wherein the wall or walls 4 forming the body 1 of the said container are made of a semi-crystalline PET. In the embodiment of the figures, the container has a volume of 25 cl and the ratio S2 on S1 is of 1:7.1. The complex three dimensional shape convenient for gripping is indicated under 3 and consists of a part substantially in the middle of the body 1, which is restricted in comparison with the greater diameter S1 on the base of its surface named S3. In this specific example the ratio S1 on S3 is of 1.3:1. The thickness of the wall 4 is around 70 μm in the zone 3. This thickness can be greater in the area of the neck and in the area of the bottom 5. In these zones, the thickness is around 100-120 μm.

Figure 3:
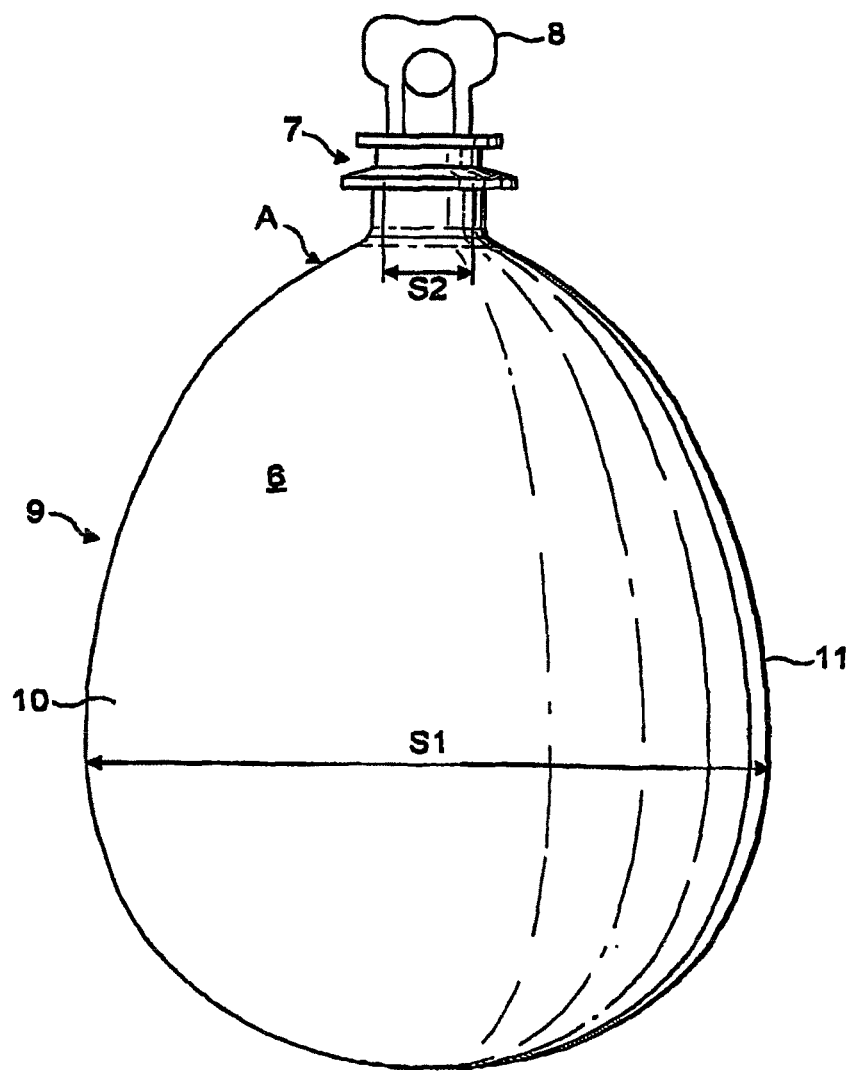
FIG. 3 is a schematic view in side elevation and in diameter of the filled container in another embodiment.

The FIG. 3 shows an assembly 9 according to the invention, wherein the body 6 of the container has the form of an egg with a wall 11 and a neck 7 and a volume of 33 cl. The neck is the opening for allowing the liquid to flow. On the figure, the neck 7 is closed with closure means 8, consisting of a screw cap. The container is filled with water 10 at a level shown by the arrow A. The diameter S2 represents the diameter in the area of the neck and the diameter S1 represents the diameter in the body, at its larger part. In the present case the ratio S2 on S1 is of 1:7.7 (10 mm:77 mm). The thickness of the wall of the body is of 60 μm.

Of course, the invention is not restricted to the embodiments described and depicted in the appended drawings. Modifications remain possible, particularly from the point of view of the construction of the various elements or by substituting technical equivalents, without thereby departing from the field of protection of the invention.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A packaging assembly comprising:
   a container having a body formed by a wall having a diameter S1 and a neck with a diameter S2, a ratio S2:S1 is 1:7.1 to 1:7.7, the container made from a semi-crystalline PET having a crystallinity between 20% and 40%, wherein substantially in the middle of the body, the wall has a diameter S3 and a wall thickness of at least 60 μm and less than 100 μm, a ratio S1:S3 is 1.2:1 to 2:1, and the diameter S3 is less than a diameter in an area between the middle of the body and a bottom portion of the body; and
   a closure attached to the neck, the closure selected from the group consisting of a cap and a sealed membrane.

2. The packaging assembly of claim 1, further comprising a product located in the container, the product comprising a functional component selected from the group consisting of a fibre, plant extract, fruit extracts, vitamins and flavors.

3. The packaging assembly of claim 1, wherein the bottom portion of the body has a wall thickness between 100 μm and 150 μm.

4. The packaging assembly of claim 1, wherein the container has a volume of less than 100 cl, and the semi-crystalline PET has a stretch index between 100 and 300 cm.

5. The packaging assembly of claim 1, wherein the container has a volume of 500 to 1000 cl, and the semi-crystalline PET has a stretch index between 500 and 700 cm.

6. The packaging assembly of claim 1, wherein the container has a volume of at least 2000 cl, and the semi-crystalline PET has a stretch index of at least about 1000 cm.

7. The packaging assembly of claim 1, wherein the crystallinity of the semi-crystalline PET is between 20% and 25%.

8. The packaging assembly of claim 1, wherein the wall thickness substantially in the middle of the body of the container is 60 μm to 70 μm.

* * * * *